United States Patent [19]

Carver

[11] Patent Number: 4,878,438
[45] Date of Patent: Nov. 7, 1989

[54] PORTABLE CONSOLE AND ARM REST APPARATUS

[76] Inventor: Donnie R. Carver, 178 Forest Retreat Rd., Hendersonville, Tenn. 37075

[21] Appl. No.: 325,900

[22] Filed: Mar. 20, 1989

[51] Int. Cl.⁴ ............................................. A47B 23/00
[52] U.S. Cl. ..................................................... 108/44
[58] Field of Search ............... 108/44, 42; 312/235 R, 312/235 A; 296/37.8

[56] References Cited

U.S. PATENT DOCUMENTS

| | | | |
|---|---|---|---|
| 2,934,391 | 4/1960 | Bohnett | 108/44 X |
| 3,345,118 | 10/1967 | Cummings | 108/44 X |
| 3,517,978 | 6/1970 | Hudson | 312/235 R |
| 4,359,004 | 11/1982 | Chappell | 108/44 |
| 4,813,751 | 3/1989 | Fenn | 312/235 A |

*Primary Examiner*—Peter A. Aschenbrenner
*Attorney, Agent, or Firm*—Leon Gilden

[57] ABSTRACT

A portable console and arm rest apparatus is set forth including a console selectively securable to the housing hump of an automobile. The console has selectively securable thereto a rearwardly extending arm rest formed with forwardly extending "L" shaped legs receivable within "L" shaped recesses within the console wherein the arm rest is formed with a perimeter wall about an arm rest tray wherein the perimeter wall is substantially equal to in height and aligned with the planar rim surrounding the planar support tray surface of the forwardly oriented console. The arm rest extends rearwardly a length substantially equal to the length of an automobile seat support surface to position the arm rest in alignment with a forward surface of the automobile's seat back rest to orient the arm rest relative to an individual positioned within the automobile seats.

9 Claims, 4 Drawing Sheets

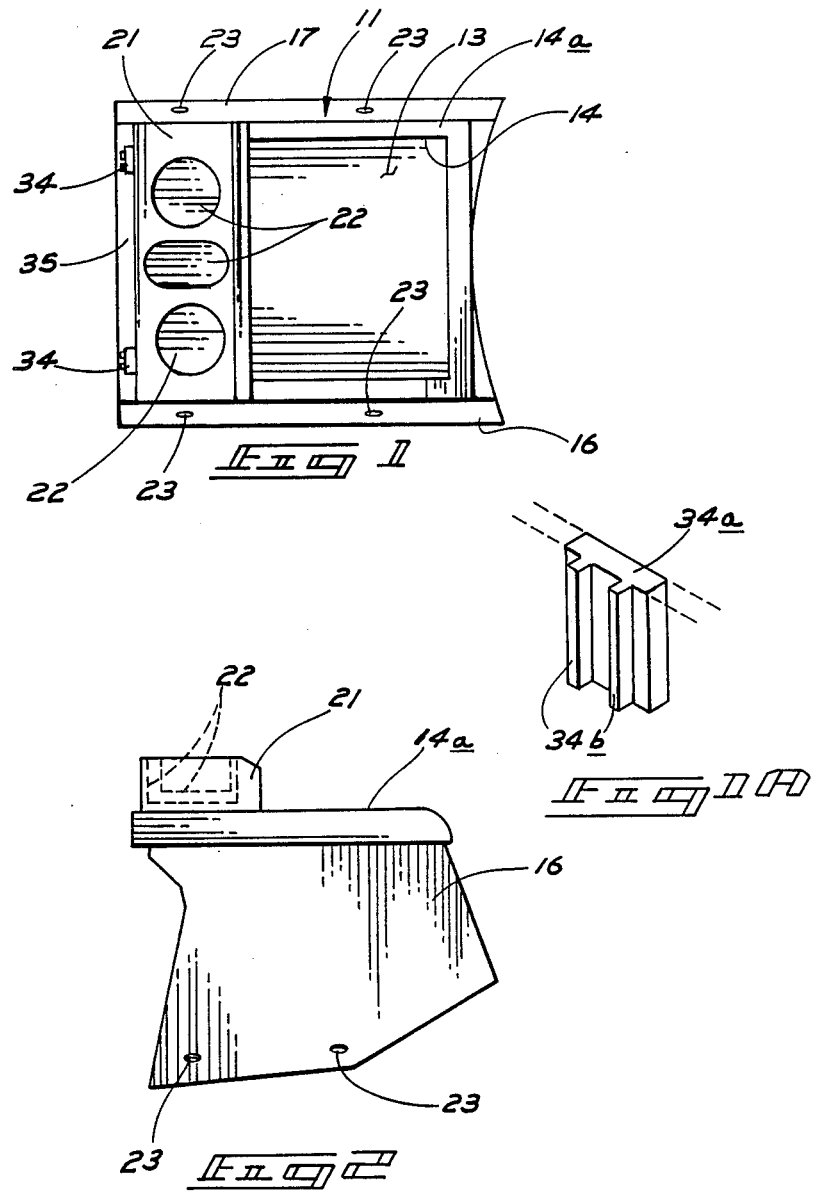

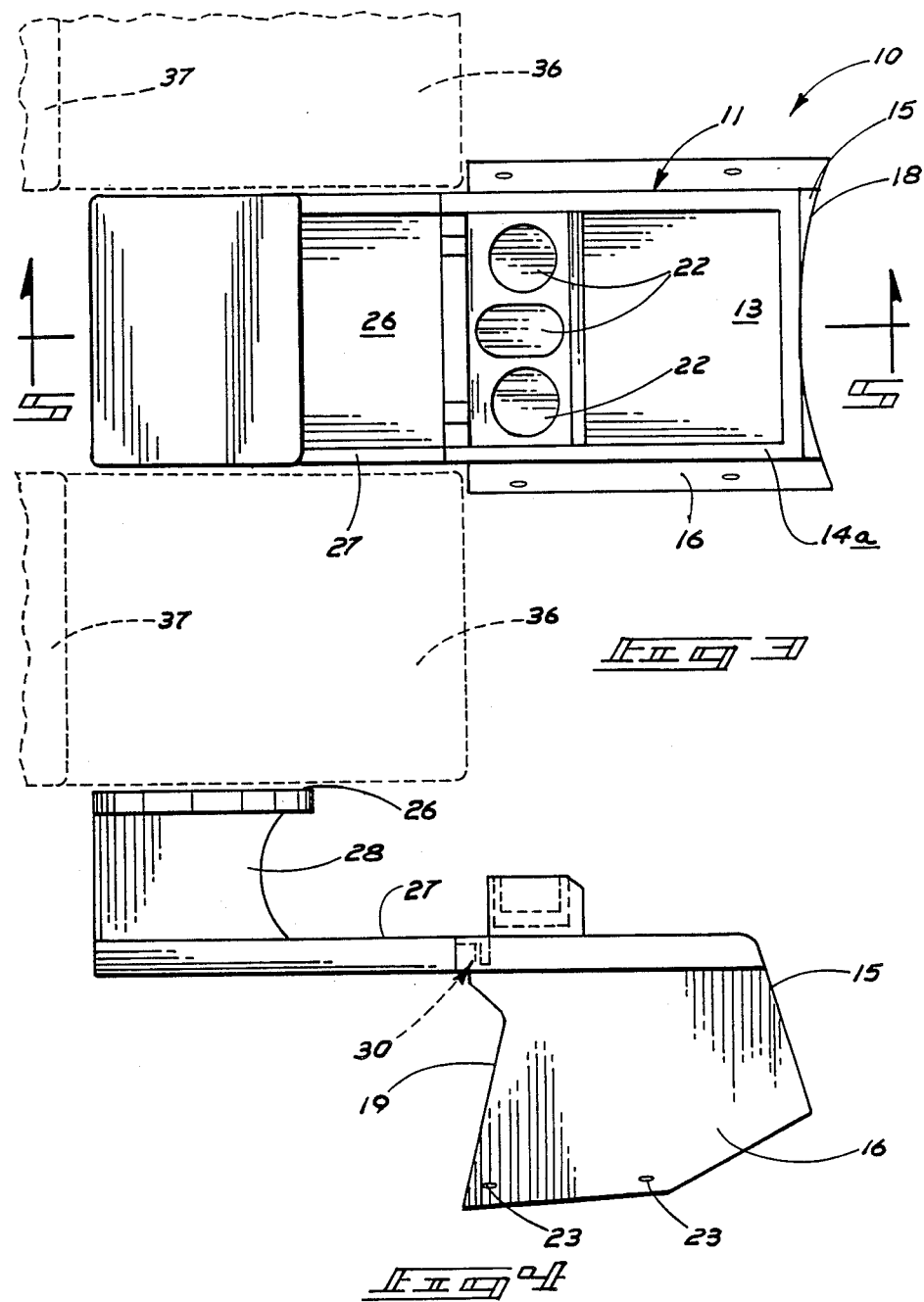

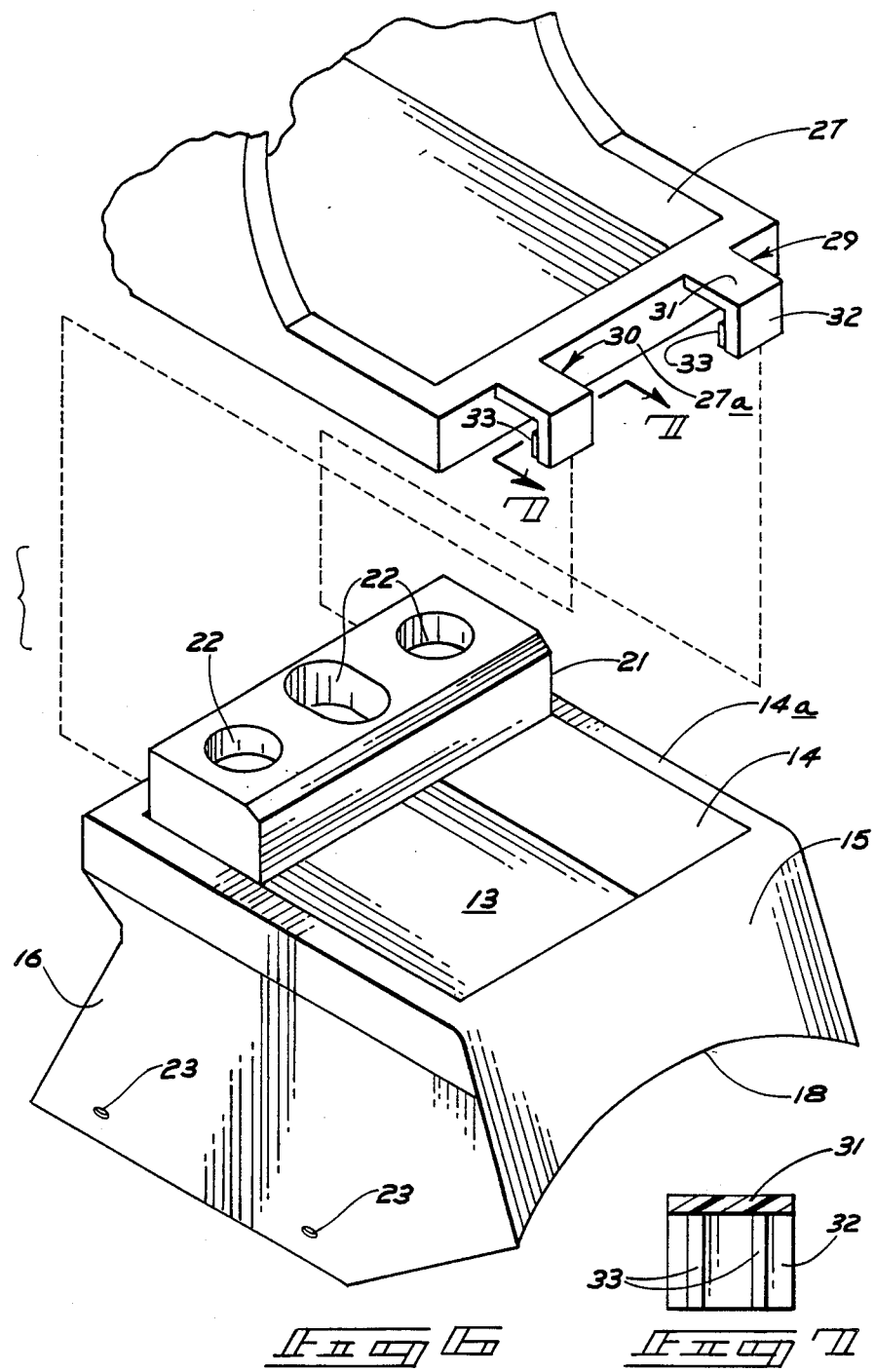

PORTABLE CONSOLE AND ARM REST APPARATUS

BACKGROUND OF THE INVENTION

1. Field of the Invention

The field of invention relates to automobile consoles, and more particularly pertains to a new and improved portable console and arm rest wherein the console is selectively securable to an automobile housing hump with an arm rest extending rearwardly and aligned with a forward console selectively securable to the console.

2. Description of the Prior Art

The use of automobile consoles that are securable to automobile housing humps as adjuncts thereto are known in the prior art. It is desirable for a driver and passenger to avail themselves of a support organization for securement of various articles such as soft drinks, and the like, and further utilize an arm rest organization which is frequently unavailable in a bucket seat arrangement of a typical automobile. The instant invention attempts to overcome the deficiencies of the prior art by providing a selectively attachable console and an arm rest selectively securable to the console to avail an automobile driver and passenger of the comfort and convenience of such a structural arrangement. The prior art has heretofore failed to provide the structural organization as set forth by the instant invention as evidenced by Chappell U.S. Pat. No. 4,524,701, for example. The Chappell patent provides for a plurality of planar support walls securable to a housing hump with a telescoping tray mounted to a support surface between the support walls. The Chappell patent does not provide for any means of selective securement of an arm rest or provision of such an organization, as set forth by the instant invention.

Pierro U.S. Pat. No. 3,939,986 sets forth a support member for securement to an automotive housing hump wherein the same is provided with foam pads for frictionally securing the support member thereto, as well as providing an upwardly extending support surface for securement of drinking tumblers and the like therewithin.

Chappell U.S. Pat. No. 4,359,004 sets forth a further example of the formerly presented patent to Chappell wherein the tray is provided by a multi-hinged organization to enable an extension of the tray for support of a greater number of articles thereon.

Barnett U.S. Pat. No. 3,163,287 sets forth a tray for use in an automotive environment wherein a plurality of sloping walls forms a "U" shaped organization for securement to an automobile hump wherein a support tray is secured to the "U" shaped organization to enable positioning of tumbler-like drinking articles therewithin.

Goings U.S. Pat. No. 3,326,445 sets forth a car seat organization positionable upon an automobile car seat with a shorter forward wall and a longer rearward wall to horizontally align the car seat tray with provision of a plurality of openings for securement of drinking tumblers therewithin, as well as a rearwardly positioned tray for securement of various articles.

As such, it may be appreciated that there is a continuing need for a new and improved portable console and arm rest apparatus wherein the same provides for selective securement of an automobile console and a selectively securable arm rest securable to the console for enabling availability of an arm rest support surface as well as an article support member to individuals in an automotive environment.

SUMMARY OF THE INVENTION

In view of the foregoing disadvantages inherent in the known types of automotive consoles now present in the prior art, the present invention provides a portable console and arm rest apparatus wherein the same is selectively securable to an automobile housing hump with an associate arm rest securable rearwardly and aligned with the forwardly positioned console. As such, the general purpose of the present invention, which will be described subsequently in greater detail, is to provide a new and improved portable console and arm rest apparatus which has all the advantages of the prior art automotive consoles and none of the disadvantages.

To attain this, the present invention comprises a forwardly mountable console including downwardly extending sloped walls with rearward and forward walls wherein the rearward and forward walls are provided with arcuate recesses cooperative with the sloping side walls to accept an automotive housing hump therewithin. Hook and loop fasteners are positioned within interior surfaces of the sloped side walls, as well as throughextending apertures, to enable permanent as well as temporary securement to the automotive housing hump. The console is provided with an upwardly extending horizontal rim overlying a downwardly oriented support tray surface with a rearwardly positioned ledge. The ledge is provided with a plurality of recesses of complementary configuration to forwardly extending "L" shaped legs of a rearwardly extending arm rest organization. The arm rest organization includes a perimeter wall aligned with the horizontal rim of the console to align the arm rest with the console. An upwardly extending cushioned arm rest support surface is provided and mounted between spaced parallel walls formed with arcuate forward recesses to enable access to an arm rest support tray underlying the cushioned arm rest.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable console and arm rest apparatus which has all the advantages of the prior art automotive consoles and none of the disadvantages.

It is another object of the present invention to provide a new and improved portable console and arm rest apparatus which may be easily and efficiently manufactured and marketed.

It is a further object of the present invention to provide a new and improved portable console and arm rest apparatus which is of a durable and reliable construction.

An even further object of the present invention is to provide a new and improved portable console and arm rest apparatus which is susceptible of a low cost of manufacture with regard to both materials and labor, and which accordingly is then susceptible of low prices of sale to the consuming public, thereby making such portable console and arm rest apparatus economically available to the buying public.

Still yet another object of the present invention is to provide a new and improved portable console and arm rest apparatus which provides in the apparatuses and methods of the prior art some of the advantages thereof, while simultaneously overcoming some of the disadvantages normally associated therewith.

Still another object of the present invention is to provide a new and improved portable console and arm rest apparatus wherein the same is provided with a console selectively securable temporarily or permanently to an automobile housing hump with a rearwardly extending arm rest support surface selectively securable to the console and aligned with the console.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the console of the instant invention.

FIG. 1a is a view of recesses in the rim of the console.

FIG. 2 is an orthographic side view taken in elevation of the console of the instant invention.

FIG. 3 is an orthographic top view of the console and arm rest apparatus of the instant invention.

FIG. 4 is an orthographic side view taken in elevation of the portable console and arm rest apparatus of the instant invention.

FIG. 6 is an isometric illustration, somewhat expanded for illustration of the portable console and arm rest apparatus of the instant invention, their configuration, and relationship.

FIG. 7 is an orthographic view, taken along the lines 7—7 of FIG. 6, in the direction indicated by the arrows.

DESCRIPTION OF THE PREFERRED EMBODIMENT

Figure 5:
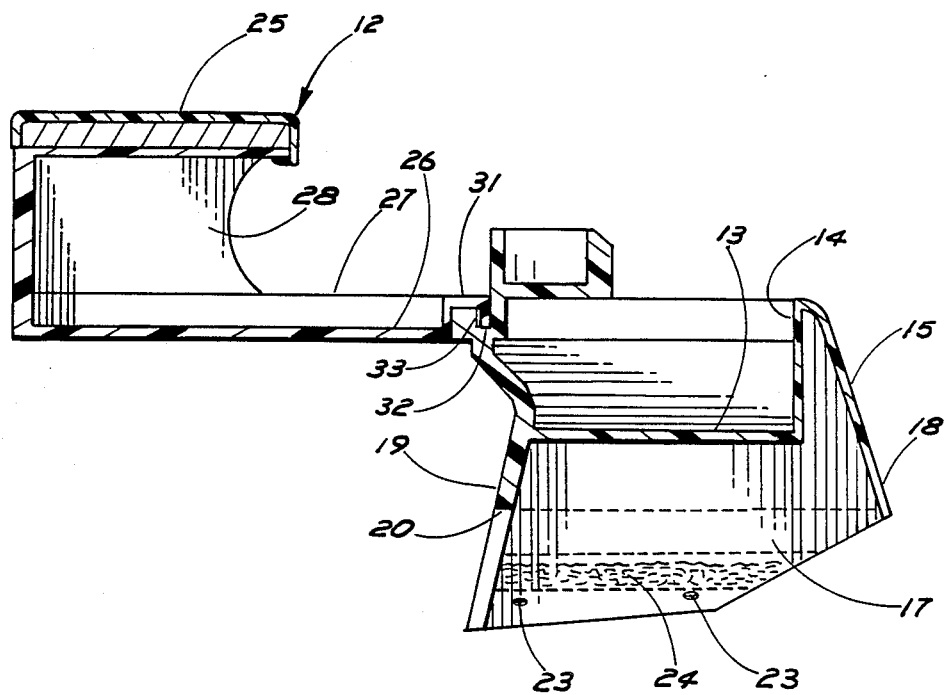
FIG. 5 is an orthographic view, taken along the lines 5—5 of FIG. 3, in the direction indicated by the arrows.

With reference now to the drawings, and in particular to FIGS. 1 to 7 thereof, a new and improved portable console and arm rest apparatus embodying the principles and concepts of the present invention and generally designated by the reference numeral 10 will be described.

More specifically, it will be noted that the portable console and arm rest apparatus 10 of the instant invention essentially comprises a console 11 with a selectively securable arm rest 12 detachably mountable to a rearwardly oriented ledge of the console.

The console includes a planar support tray surface 13 extending underlying and orthogonally oriented relative to surrounding perimeter support surfaces 14 terminating in an upwardly oriented horizontal planar rim 14a. Extending downwardly and forwardly of the planar rim 14a is a forwardly sloping support wall 15. Extending to either side of the planar rim 14a is a respective right and left outwardly sloping support wall 16 and 17 with a rear wall 19 sloping rearwardly and outwardly relative to the planar rim 14a. The forward support wall 15 and the rear wall 19 are formed with a respective forward arcuate recess 18 and a rearward arcuate recess 20 wherein the forward and rearward arcuate recesses are aligned relative to one another to accommodate the acceptance of an automobile housing hump therewithin. The interior surfaces of the right and left support walls 16 and 17 each include mounting apertures 23 therethrough to enable permanent mounting of the console relative to an automotive housing hump, as well as the utilization of hook and loop fastener surfaces 24 in lower interior surfaces of the right and left support walls 16 and 17 to accommodate both permanent and temporary securement of the console 11 to the automotive housing hump. Spanning opposite sides of the planar rim 14a is a tray 21 formed with a series of tray recesses 22 therewithin for securement of drinking tumblers and various articles therewithin.

Securable to a rear support ledge 35 positioned rearwardly of the tray 21 is an arm rest 12. The arm rest 12 includes a padded arm support cushion 25 overlying a planar arm rest tray 26. A perimeter wall 27 surrounds the underlying planar arm rest tray 26 wherein the perimeter wall 27 includes a forward arm rest wall 27a with orthogonally outwardly extending first and second "L" shaped legs 29 and 30 spaced along the forward arm rest wall 27a. The padded arm support cushion 25 is spaced to a rearward portion of the arm rest tray 26 and is mounted upon parallel spaced support side walls formed with concave arcuate recesses to enable access to the underlying arm rest tray surface 26. The arm rest tray 26 extends forwardly of the padded arm support cushion 25 wherein the length of the arm rest 12 is substantially equal to that of an associated automotive seat support surface 36 and a rearward edge of the arm rest 12 is essentially aligned with the automotive seat back rest 37 to position the padded arm support cushion 25 in alignment with an individual's arm, either the driver or passenger of the associated automobile.

The first and second "L" shaped legs 29 and 30 are each provided with a horizontal leg 31 and an orthogonally disposed vertical leg 32 formed at an outward terminal end of the horizontal leg 31. Integrally secured and formed to the interior surface of the vertical legs 32 are spaced parallel registration ribs 33 receivable within rib recesses 34b formed rearwardly of a rectangular blind recess 34a to define a complementary recess 34 to receive the respective first and second "L" shaped support legs 29 and 30. The complementary recesses 34 are formed orthogonally interiorly of the rear support ledge 35 wherein the width of the ledge 35 is equal to the length of each horizontal leg 31 wherein the depth of the respective rectangular blind recess 34a and associated rib recesses 34b are equal to the height of each vertical leg 32 to thereby align the arm rest 12 with the console 11. The surface of the perimeter wall 27 is thereby in substantial alignment with the planar rim 14a of the console 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, fallin within the scope of the invention.

What is claimed as being new and desired to be protected by Letters Patent of the United States is as follows:

1. A console and arm rest apparatus for use in a vehicular interior containing a longitudinal housing hump and at least one seat wherein said seat includes an underlying seat support of a predetermined length measured forwardly from an upwardly extending seat back rest, said apparatus comprising, a console and an elongate arm rest selectively securable to said console;

said console including a horizontal support surface disposed below a horizontal rim, and a right and left side wall sloping outwardly with respect to right and left side portions of said horizontal rim, and a forward wall joining forward edges of said right and left side walls sloping outwardly with respect to said forward portion of said horizontal rim terminating in a first arcuate recess underlying said rim, and a rear wall extending downwardly from a rear portion of said horizontal rim joining rear edges of said right and left side walls terminating in a second arcuate recess, and wherein said first and second arcuate recesses are aligned with one another to accommodate said housing hump, and said elongate arm rest including attachment means securable to engagement members formed in said rear portion of said horizontal rim to secure said arm rest coextensively and rearwardly of said console.

2. A console and arm rest apparatus as set forth in claim 1 wherein said arm rest includes a planar arm rest tray disposed below a perimeter wall defining a forward arm rest wall wherein said forward arm rest wall includes said attachment means.

3. A console and arm rest apparatus as set forth in claim 2 wherein said attachment means comprises a plurality of spaced "L" shaped legs extending forwardly of said forward wall.

4. A console and arm rest apparatus as set forth in claim 3 wherein each "L" shaped legs includes a horizontal leg and a vertical leg and wherein said horizontal leg is of a length substantially equal to the length of said rear portion of said horizontal rim, and each vertical leg is receivable within the engagement members.

5. A console and arm rest apparatus as set forth in claim 4 wherein the engagement members define spaced blind recesses formed orthogonally downwardly relative to said horizontal rim and further include rib recesses, and each vertical leg includes a plurality of spaced ribs receivable within said rib recesses and wherein each blind recess is of a depth substantially equal to the depth defined by each vertical leg.

6. A console and arm rest apparatus as set forth in claim 5 wherein a plurality of side walls extend upwardly and orthogonally relative to rear portions of said perimeter wall and accommodate a padded support cushion upon upper terminal edges of said spaced side walls, and wherein said spaced side walls include forward arcuate recesses to enable access to the underlying arm rest tray.

7. A console and arm rest apparatus as set forth in claim 6 wherein an article tray spans the right and left side portions of the horizontal rim and has formed therein a series of article recesses to receive various articles therewithin, and wherein said article tray is positioned adjacent the rear portion of the horizontal rim to provide alignment of the spaced vertical legs to be received within the spaced blind recesses formed in the rear portion of the horizontal rim.

8. A console and arm rest apparatus as set forth in claim 7 wherein the arm rest is of a length equal to said predetermined length of said seat support.

9. A console and arm rest apparatus as set forth in claim 8 wherein lowermost interior portions of said right and left side walls include hook and loop fasteners for attachment to said housing hump, and further include through-extending apertures for accommodating fasteners to secure said console to said housing hump.

* * * * *